(12) United States Patent
Wootton et al.

(10) Patent No.: US 6,770,865 B2
(45) Date of Patent: Aug. 3, 2004

(54) SYSTEMS, METHODS, AND DEVICES FOR DETECTING LIGHT AND DETERMINING ITS SOURCE

(75) Inventors: John R. Wootton, St. Louis, MO (US); Gary Waldman, Aurora, CO (US)

(73) Assignee: Engineered Support Systems, Inc., St. Louis, MO (US)

( * ) Notice: Subject to any disclaimer, the term of this patent is extended or adjusted under 35 U.S.C. 154(b) by 46 days.

(21) Appl. No.: 10/175,616

(22) Filed: Jun. 20, 2002

(65) Prior Publication Data

US 2003/0234349 A1 Dec. 25, 2003

(51) Int. Cl.$^7$ .................................................. G01J 3/50
(52) U.S. Cl. ...................................... 250/226; 250/216
(58) Field of Search ................................. 250/226, 216, 250/201.1, 206, 205, 214.1, 208.1, 339.02; 356/154, 152.1; 372/9, 8, 12

(56) References Cited

U.S. PATENT DOCUMENTS

| | | | |
|---|---|---|---|
| 5,085,507 A | | 2/1992 | Williams et al. |
| 5,149,970 A | * | 9/1992 | Whitney ................. 250/339.02 |
| 5,428,215 A | | 6/1995 | Dubois et al. |
| 5,771,092 A | | 6/1998 | Dubois et al. |
| 6,023,058 A | | 2/2000 | Merle et al. |
| 6,127,670 A | * | 10/2000 | Miyahara ................. 250/208.1 |

OTHER PUBLICATIONS

Waldman, Gary and John Wootton, Electro–Optical Systems Performance Modeling, Massachusettes: Artech House Inc., 1993 (full text) Month Unknown.

* cited by examiner

*Primary Examiner*—Que T. Le
(74) *Attorney, Agent, or Firm*—Lewis, Rice & Fingersh, LC (57) ABSTRACT

A light detecting device, particularly one which indicates illumination by a laser, and methods for its use. The device includes at least two light detectors which each comprise a light sensor and a light control filter. The light control filter includes microlouvers arranged so that the microlouvers of the two different light detectors are at different angles. The light detecting device may be used to determine the direction to the source of the light detected. Further, two or more devices may be combined into a system that allows for a user to determine the distance to the source of light, particularly laser light emitted by a laser rangefinder. The system is designed to be functional under combat or other battlefield conditions and relatively simple and inexpensive to manufacture.

20 Claims, 5 Drawing Sheets

SYSTEMS, METHODS, AND DEVICES FOR DETECTING LIGHT AND DETERMINING ITS SOURCE

BACKGROUND OF THE INVENTION

1. Field of the Invention

This disclosure relates to the field of laser warning systems. In particular, to laser warning systems for use on combat vehicles to detect illumination of the vehicle by a laser targeter.

2. Description of the Related Art

Almost since their discovery, lasers have been used by the military for the targeting of enemy vehicles for ordnance delivery. Lasers are used in many forms for their task at ordnance delivery. Lasers are used in rangefinders, in target designators, and in other applications for targeting the enemy. In use, some lasers are steady, while others are pulsed. Further, lasers can be used by all types of military resources from individual infantrymen, specialized targeting vehicles (such as those for forward observation), combat vehicles (such as tanks), and even by battleships or aircraft.

One common utilization of the laser is to act as a rangefinder. This type of arrangement is particularly common in conjunction with armored fighting vehicles such as tanks. In these cases, the target enemy tank is illuminated by a laser from the firing tank and the time it takes for the laser to project from the firer and return to the firer (having reflected off the target) provides for an extremely accurate indication of the distance of the target. The firing tank will then have the laser data fed into a processor or computer which will direct automated systems for the tank's main gun to fire a shell at an appropriate elevation to hit the target. Rangefinders can also rapidly calculate the speed and direction that a target is moving in addition to its distance, allowing for the weapon system to compensate for that movement and increase the likelihood of hitting the target.

Rangefinders are particularly beneficial for determining the distance of objects at a long distance and, in addition to tanks, are used in numerous other applications on the battlefield. In another exemplary application, forward observers sighting for distant artillery can use laser rangefinders to determine the distance they are from an enemy target. This information can then be combined with location information of the forward observer, such as from global positioning system (GPS) data. The total data can then be relayed to the remote artillery batteries which, from their own known location, can extrapolate the position of the enemy, and the artillery weapons can be directed at the target.

Lasers can also be used as a target illuminator or designator. Generally in this role, the illumination is used to guide weapons that can seek the laser indicator's illumination, as opposed to the laser being used to predict a fire path upon its own reflection. In particular, with illuminators or designators, the ordnance can detect the laser light reflecting from the target, and computers on-board the ordnance or weapon system direct the ordnance to hit the illuminated or designated target. Laser designators are regularly used with laser guided bombs and missiles.

The above systems are all generally referred to as laser "targeters" as they allow for the improved targeting of a designated enemy through the use of a laser beam. In particular, they allow for ordnance (for example, a missile fired from an off-shore ship or an artillery round) to be directed at a particular target because that target has been "hit" or illuminated with the laser. Regardless of the type of laser targeter that is being used, the danger to the target is clear. Being illuminated by a laser targeter generally implies that a weapon is being directed at you, and often the time from laser illumination to the time of ordnance impact is relatively short.

Common targets of laser targeters are objects of particular value. These can be armored fighting vehicles (particularly in armored combat situations), supply trucks, command vehicles, aircraft, watercraft, bunkers, factories, or other types of military targets. To try and combat the threat presented by laser systems, laser warning systems have been created which can be attached to a vehicle to warn its crew that they have been illuminated and need to respond to an imminent threat. The warning systems generally operate as threshold detectors. In particular, the detectors are always sampling the light illuminating the vehicle (generally within a particular spectrum where laser targeters are used) and when they receive a spike of illumination at a particular wavelength (a likely indication that a laser system has illuminated the target) which is larger than a threshold value, they provide a warning to the crew that they have probably been targeted by a laser targeter. The threshold is generally set high enough that changes in the ambient lighting or noise (e.g. because of sunlight changing during the day, or a nearby flashlight in the evening) are insufficient to set off the detector, while at the same time set sufficiently low that a laser targeter is detected whenever it is used to target the vehicle.

While these devices have gotten fairly good at detecting the presence of a laser, the limitation on these devices is that they can only provide warning of the presence of a laser. There is no indication of the actual position of the laser source. To put it more simply, these systems warn of a danger, while providing no indication of how to prevent the ordnance "directed" by the laser from hitting the target. Laser targeting systems can sometimes be avoided, such as, by taking certain sudden actions (such as radical movement) or by directing other ordnance upon the source of the laser to destroy it and have ordnance guided by the laser lose its navigation before it has locked onto the designated target. In some situations, knowledge of the source can allow for retaliation for the destruction of the target either by the target or by other units friendly to the target. In this way the damage which can be caused by an enemy with a targeting system can be minimized, or possibly prevented.

This minimization of damage is one of the most important in combat. Even if the target cannot avoid destruction, the inability of other forces friendly to the target to retaliate upon the laser source means that laser targeters essentially operate anonymously on the battlefield with little consequence of being active. Further they can target multiple enemy units before needing to avoid any retaliation. If the source of the laser could be rapidly identified, retaliatory fire could quickly be brought to bear to limit the effectiveness of the targeter (and to destroy it to prevent later use). Under such circumstances, the laser may not be used in the first place as the use of it may be overly dangerous, and/or strategically inefficient. Under the current system, however, a laser source is relatively safe from any retaliation, and can act without fear of being targeted for their targeting action.

What is missing in laser warning systems is the equivalent of what happens to another device in a parallel part of the spectrum, namely the radio frequency (RF) part. Radar could readily be used on the battlefield for rangefinding, designation, or any of the other tasks for which lasers are used. However, there exist electronic countermeasures for the use of radar. In particular, there have been developed interferometers to locate the source of the targeting radar such that the use of a radar on the battlefield will generally result in a retaliatory strike on the radar. Because of this, radar has lost effectiveness as a targeting apparatus in many circumstances to lasers because the single shot allowed by the radar prior to retaliation generally does not provide a sufficient battlefield advantage to justify the potential loss of the radar source.

The radar interferometer, however, cannot be readily adapted to detect the position of a laser. An interferometer for use at the frequencies of most laser light used in laser targeters would require a much closer tolerance and hence would be too expensive for battlefield use. There is therefore a need in the art for a laser warning system that can determine both the direction and distance to a laser source in an accurate manner that is suitable for use on a military vehicle under combat conditions.

SUMMARY

Because of these and other previously unknown problems in the art, it is therefore desired to have a laser location system that allows for a user to determine the direction and/or distance to a source of light such as laser light. The system is designed to be functional under combat or other battlefield conditions and relatively simple and inexpensive to manufacture.

Described herein, amongst other things, is an embodiment of a laser warning device comprising: an array of at least two light detectors with each of the light detectors comprising a light sensor and a light control filter; wherein each of the light control filters comprises a plurality of microlouvers; and wherein the angle of the microlouvers in the first light control filter is different from the second light control filter. The microlouvers of one of the light control filters may be perpendicular to the plane and/or generally may be arranged 30° from the perpendicular to the plane.

In an embodiment, the array comprises at least three light detectors the angle of the microlouvers in the third light control filter being different from the angles of the first and the second light control filters. In an embodiment, the microlouvers in the first light control filter are generally 30° in one direction from the microlouvers in the second light control filter, which may be perpendicular to the plane of the array, and the microlouvers in the third light control filter may be generally 30° in the opposite direction from the microlouvers in the second light control filter.

In another embodiment, there is described a laser warning device comprising: an arrangement of a plurality of arrays of light detectors, each of the arrays including at least two light detectors and each of the light detectors including a light sensor and a light control filter.

In still another embodiment at least one of the arrays may comprise at least three light detectors and/or may have a field of view of generally 60°. The arrangement of the arrays may be hexagonal and/or the plurality of arrays may comprise exactly six arrays. In another embodiment, each of the light control filters may comprise a plurality of microlouvers, wherein the angle of the microlouvers in a first light control filter is different from the angle of the microlouvers in a second light control filter.

In still another embodiment there is described a laser location system comprising: at least two laser warning devices wherein each of the laser warning devices includes at least two light detectors and wherein each of the light detectors includes a light sensor and a light control filter.

In a yet further embodiment, the laser warning devices in a laser location system may be a known distance apart and/or may comprise an arrangement of a plurality of arrays of light detectors, each of the arrays including at least two light detectors, and each of the light detectors including a light sensor and a light control filter. The plurality of arrays may comprise exactly six arrays, may be arranged hexagonally, and/or each of the light control filters may comprise a plurality of microlouvers, wherein the angle of the microlouvers in a first light control filter is different from the angle of the microlouvers in a second light control filter.

In a yet further embodiment, there is described a method of locating a light source comprising: providing a plurality of light detectors, each light detector comprising a light sensor and a light control filter comprising a plurality of microlouvers arranged at an angle to the plane of the light control filter; providing that the angle of the microlouvers in a first light detector be different from the angle in a second light detector, and that the angle of the microlouvers in a third light detector be different from the angle in a fourth light detector; arranging the first light detector and the second light detector into a first array, and arranging the third light detector and the fourth light detector into a second array; positioning the first array at a known distance and orientation relative to the second array; defining a predetermined point with a position known relative to at least one of the first array and the second array; receiving light from a light source at both the first array and the second array; determining the direction of the light source relative to both the first array and the second array; and calculating the distance of the light source from the predetermined point.

DETAILED DESCRIPTION OF PREFERRED EMBODIMENT(S)

Although the laser location systems, laser warning devices, light detectors, and related methods discussed below are discussed primarily in terms of their use for detecting a laser rangefinder being used to illuminate one military vehicle by another military vehicle in a combat situation, it would be recognized by one of ordinary skill in the art that the systems and methods herein disclosed could be used for any type of laser targeter. Further, it would be understood by one of ordinary skill in the art that while the systems below particularly relate to detecting laser light, the systems could be used to detect any type of illumination from any type of source, regardless of the wavelength(s) used. It is further recognized, that the detection of the source distance and/or direction for various types of illumination (whether or not laser light) would also be useful in numerous other situations outside of the military such as, but not limited to, theatrical lighting design, civil engineering, and astronomy. The systems and methods can also be used in military training or for entertainment, acting as a system to provide for indications during a combat drill or combat game who has been "hit" by the enemy and which particular unit "destroyed" its target. It should also be recognized that for the purposes of this disclosure, a laser warning device will generally be a device including at least one array of light detectors where an array of light detectors includes at least two light detectors. A laser location system will generally be a system including at least one laser warning device.

Figure 1:
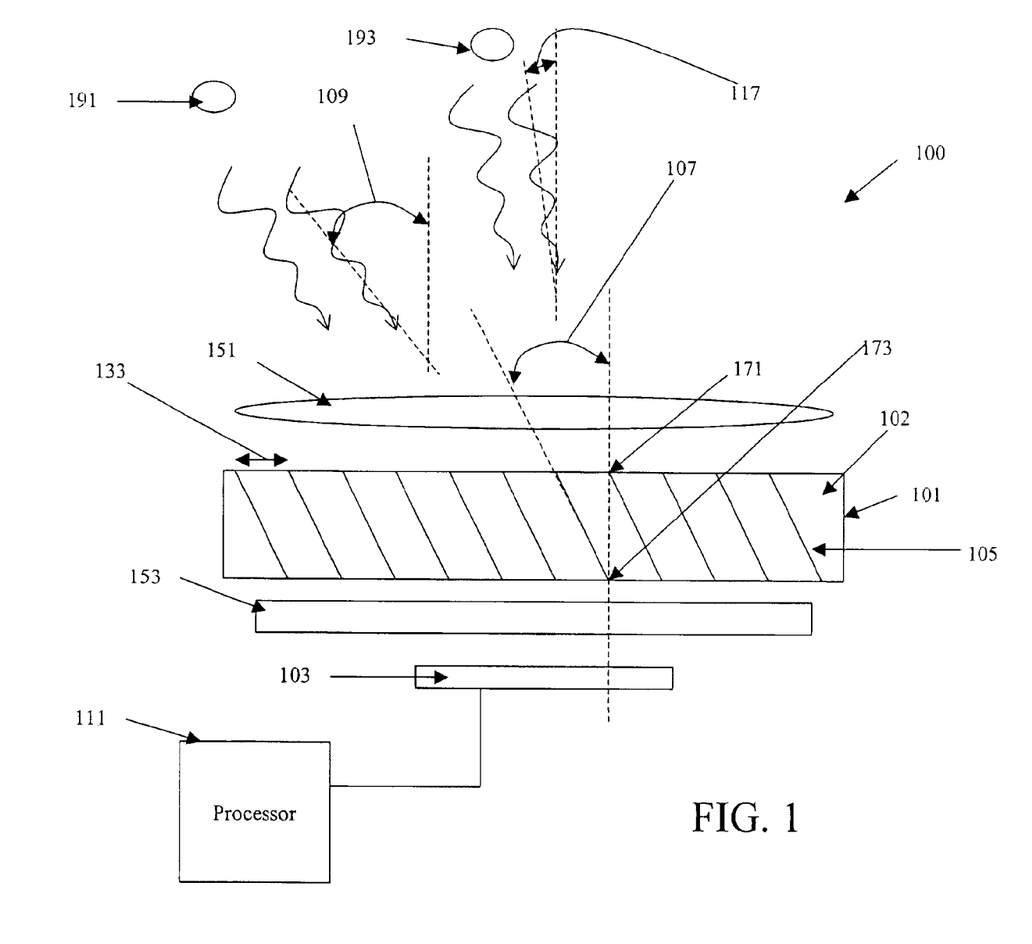
FIG. 1 provides a depiction of an embodiment of a light detector along with two different incumbent light paths.

FIG. 1 provides for a depiction of a light detector (100). Light detector (100) will generally be used to detect laser light, but could detect any type of light in another embodiment. Light detector (100) is designed to determine the intensity of light impinging upon its outer surface. This can generally be thought of as a light whose source is toward the top of FIG. 1. Light detector (100) includes a light control filter (101) and a light sensor (103). The light detector (100) may also include focusing optics (151) and/or a spectrum filter (153). Optics (151) are an optional portion of the light detector (100) which may be used to increase the signal to background ratio of light entering the sensor (103), which helps in the false alarm situation. In most cases, such optics (103) will be unnecessary. Spectrum filter (153) may be positioned as shown behind the light control filter (101) or may be positioned in front of the light control filter (101). The spectrum filter (153) acts to only allow light of a particular spectrum of wavelengths to reach the light sensor (103). In this manner, the light sensor (103) can be limited to detecting light which is generally around the wavelength one would expect laser targeter light to be. In this way, the ambient light "noise" (such as visible light) can be reduced before it reaches light sensor (103). The reduction helps to prevent the light sensor (103) from receiving so much light "noise" that it is incapable of recognizing that a particular light (namely the laser targeter) has been added to the background noise. The spectrum filter (153) is again an optional piece and need not be used in an embodiment.

Light control filter (101) comprises a high performance plastic film or similar support (102) containing a plurality of closely spaced microlouvers (105). The microlouvers (105) can be thought of as essentially permanently placed "blinds" and are described by a fixed angle (107) with regards to the perpendicular of the support (102). In FIG. 1, angle (107) is 30 degrees. Further, the microlouvers (105) are spaced apart a distance (133). The angle (107) and distance (133) may be of any value but are generally chosen to provide the light control filter (101) with a particular angular "field of view" where some percentage of light impinging on the light control filter (101) is allowed to pass through the filter, while at other positions, the light is generally blocked from passing through the light control filter (101).

Like the spectrum filter (153), the light control filter (101) therefore generally helps to prevent unwanted light from being detected by light sensor (103). In particular, the light control filter (101) only allows the light sensor (103) to detect light which is within the field of view of the light control filter (101). To select the particular field of view, the angle (107) may be specifically chosen. In an embodiment, angle (107) is chosen to be less than or equal to 30 degrees and the distance (133) will be generally chosen such that the top (171) of one microlouver is perpendicularly aligned with the bottom (173) of the subsequent microlouver, Therefore light perpendicular to the plane of the support is the extreme of light which is allowed transmission.

The light detector also includes light sensor (103) which is located on the far side of the light control filter (101) and spectrum filter (153) from any impinging light. The light sensor (103) can be of any type, but will generally have a surface which is reactive to the intensity of light impinging on light sensor (103). Often, this reactivity will relate to electrical properties of the light sensor (103). For example, the resistance in an electrical circuit including the light sensor (103) will change proportional to the intensity of the light impinging on the light sensor (103). This change in resistance is then detected by an attached processor (111) which can determine the associated intensity for a particular resistance.

The use of the light detector (100) of FIG. 1 generally operates as follows. The microlouvers (105) of the light control filter (101) serve to block light from directions outside its field of view from being detected by light sensor (103) (other than some minimal noise). For light that is projecting from a source within the field of view, however, the light control filter (101) alters the intensity of the received light based on where in the field of view the light is being emitted from. As shown in FIG. 1, when light from a first light source (191) strikes the light control filter (101) at a first angle (109) (which happens to be the same as angle (107)), almost all the light is transmitted by the microlouvers (105). Light however from the second light source (193) (which is of the same intensity and at the same distance as first light source (191)) hits at an angle (117), which is partially deflected and/or absorbed by the light control filter (101) and therefore only a percentage of the intensity passes through the filter (101) leading the light sensor (103), and associated processor (111), to detect a lower intensity.

The light detector (100) therefore provides an indication of the direction of a light source whose light is impinging upon or "illuminating" the light detector (100). Returning to FIG. 1, if the two light sources (191) and (193) are the only two light sources (of equal illumination intensity) in existence, and only one is on at a time, the light detector (100) would be able to determine which light source is being used based on the intensity of the received light detected by the light sensor (103) and the processor (111). In particular, a higher intensity would indicate first light source (191) while a lesser intensity would indicate second light source (193).

While FIG. 1 provides a first indication of how a direction can be determined, there can be problems with making such a determination. In particular, the intensity of the light source detected at the light detector (100) is dependent on many separate variables. These include the direction of the light source with respect to the angle of the microlouvers (105), the distance of the light source from the light sensor (103), and the original light source's intensity. There also are considerations related to optical losses within the light detector (100), and the sensitivity of light sensor (103). As is well understood by those of skill in the art, light transmission through a substance (such as air) results in dissipation and dispersion of the light as the light travels. Over a long distance, therefore, even laser light will decrease in intensity and will disperse over a wider area.

Because of this, the single light sensor (103) placed behind the filter (101) would be able to detect that a certain intensity of light has hit the sensor but would not accurately be able to determine a distance because the light sensor (103) and/or processor (111) does not know the initial value of any of the variables above. That is, the same light at an angle X and distance Y from the light detector (100) will have a similar intensity to a light at an angle W closer to the angle of the louvers, and at a distance Z further from the filter. Further, the initial intensity of either source could be any valve, thus leading to further problems of determination.

Finally, internal calibration of the light detector (100) may be unknown creating still further problems. Therefore, for all practical purposes, the light detector (100) of FIG. 1, can, on its own, only narrow a set of possible sources of light but cannot accurately limit that set in a meaningful way.

Figure 2:
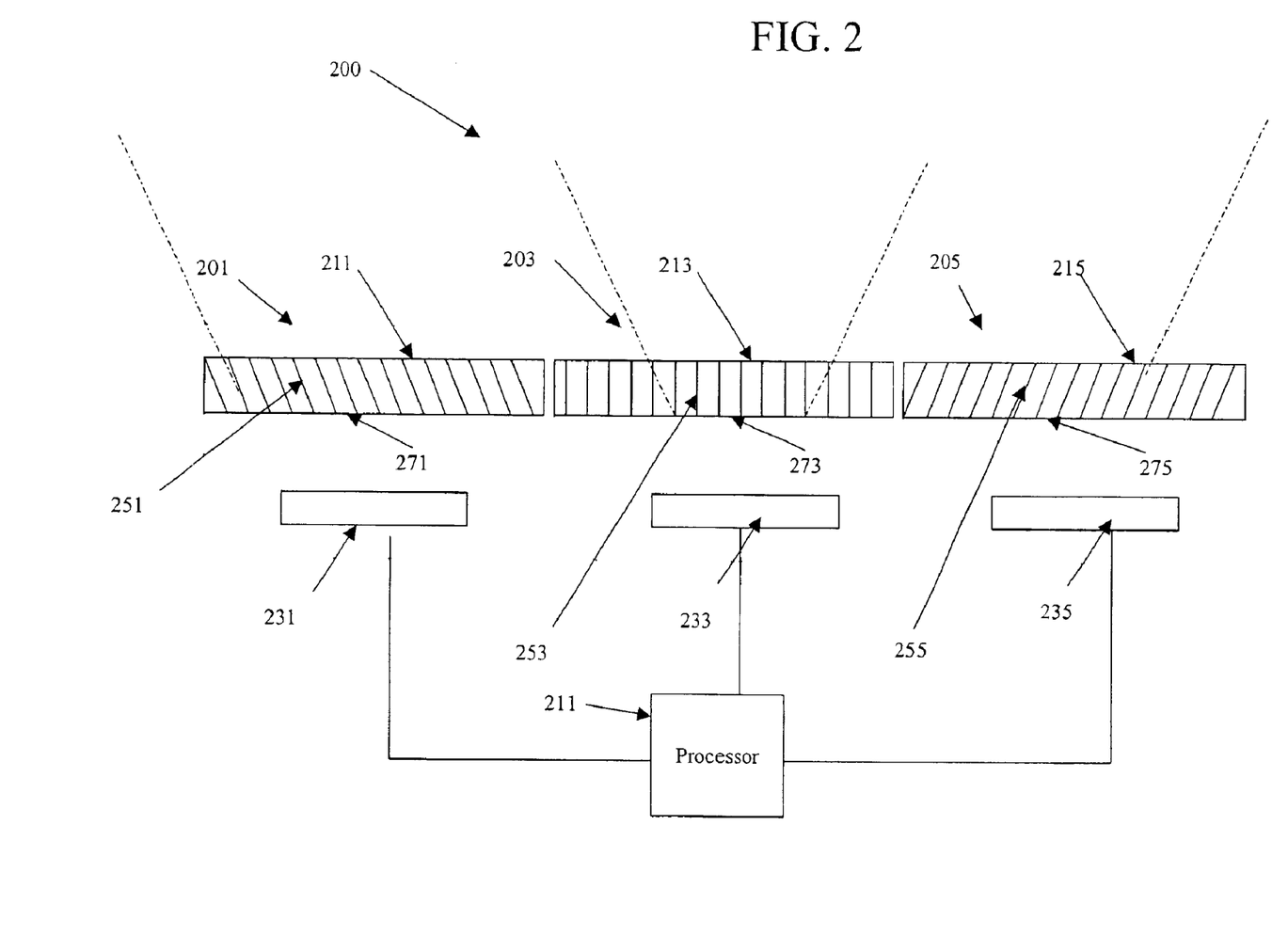
FIG. 2 provides a depiction of an embodiment of a planar array of light detectors.

To provide for the determination of the direction and distance, it is therefore preferable to have a laser warning device which does not utilize the absolute intensity of the illumination to determine the distance and/or direction. FIG. 2 provides for a laser warning device comprising an array (200) of at least two light detectors such as those described in FIG. 1. In array (200) there are three light detectors (201), (203), and (205) which are all of similar design to light detector (100) provided in FIG. 1 and which are arranged in a plane; however, it would be apparent to one of skill in the art that in an alternative embodiment only two detectors are needed in any array (200), or more than three detectors could also be used in a single array (200) with or without a planar arrangement. For simplicity, each light detector (201), (203) and (205) is depicted as including a corresponding light filter (211), (213), and (215) similar to light filter (101) of FIG. 1, and a corresponding light sensor (231), (233), and (235) similar to light sensor (103) of FIG. 1. Any of light detectors (201), (203) and (205) may also include optics and/or spectrum filters as discussed in conjunction with FIG. 1, but the depicted embodiment, for simplicity, depicts neither.

The light detectors (201), (203), and (205) all operate in essentially the same way as light detector (101), however the light filters (211), (213), and (215) for the detectors (201), (203), and (205) respectively have their microlouvers set to different angles. In particular, filter (211) has microlouvers (251) set to 30 degrees, filter (213) has microlouvers (253) set to 0 degrees, and filter (215) has microlouvers (255) set to −30 degrees (thirty degrees in the opposite direction from filter (201)). One of ordinary skill in the art would recognize that these particular microlouver settings are not required, and that other microlouver settings may be used as will be discussed later. The microlouvers (251), (253), and (255) also have the same relative spacing. In particular, the distances (271), (273) and (275) between each of the sets of microlouvers (251), (253), and (255) are all equal, and are set up in such a manner that when the microlouvers are tilted thirty degrees (such as microlouvers (251)), the top of one microlouver (251), is perpendicular (relative to the plane of the support (231)) to the bottom of the adjacent microlouver (251). Alternatively, a line connecting the top and bottom point of two adjacent microlouvers (253) in the center light control filter (203), makes a 30 degree angle (the angle at which the outer light control filters (201) and (205), microlouvers (251) and (255) are placed) with each microlouver (253). This particular arrangement provides for light control filter (203), to have a 60 degree field of view as discussed later, but is not necessary in alternative embodiments.

Each light detector (201), (203), and (205) is provided with a corresponding light sensor (231), (233) or (235) the output of which is fed into processor (211). Processor (211) may be any type of processor including, but not limited to, a dedicated processor, a computer, or a processor which is a portion of the onboard fire control or positioning system of a tank or other military vehicle. In another embodiment, each individual light sensor (231), (233) or (235) could have a dedicated processor instead of using centralized processor (211).

When light from a distant source hits the array (200), the three detectors (201), (203), and (205) will each detect a different amount of intensity due to the filtering by the different light control filters (211), (213) and (215). By comparing (ratioing) the difference of the output of the detectors that detect the laser beam, with the sum of these signals, the direction can be ascertained.

The ratioing basically works as follows, laser light hitting the array is always from the same point source (there is only one laser doing the targeting) therefore the intensity of the light received by either detector started at the same intensity. Further, because the detectors are close together compared to the distance the laser beam traveled, the laser light drops off to virtually the same intensity for each detector in the array. Therefore the same intensity of laser light can be considered to hit each detector. Since each light detector is also of generally similar manufacture, internal differences are also cancelled out. Therefore, the most significant difference in intensity measured by the individual detectors, is due to the angle of the light relative to the angle of the associated light control filter's microlouvers. As the angle of the microlouvers relative to each other is constant and known, the direction of the source of the laser can therefore be accurately determined based on the ratio (relationship) of the intensity at one detector relative to the other.

It can also be seen that this ratio is not dependent on any changes in ambient light by using the total light to determine the ratio. With ambient light present, the ratio of the laser light still exists but the ambient light will increase the absolute intensity of light detected by the detectors. A pure ratio may therefore hide the true "difference" of the detectors, however, as would be understood by one of ordinary skill in the art, by using the difference and sum of the intensity detected by the detectors, the mathematical ratioing can be preserved (as the general increase cancels out). It is also desirable for the detector to have a high signal to noise ratio (SNR). The array's (200) SNR is discussed later in some mathematical calculations to show that it is suitably high.

In the array (200) of FIG. 2, the angles chosen for the various detectors are chosen to provide for a preferred field of view. In particular, as mentioned earlier, the center detector (203) has a 60 degree field of view. Further, each side detector generally has about a 30-degree field of view. Further, as can be seen from the interrelationships of the chosen distances (271), (273), and (275) and the angles of the microlouvers (251), (253), and (255), laser light from any direction inside the field of view of the array (200) will be seen by exactly two light detectors, except for in certain easily definable situations. Specifically, as would be understood by one of skill in the art, light from the extremes of the field of view (+30 degrees and −30 degrees) may only be seen by a single detector, and/or light perpendicular to the array (200) may only be seen by a single detector (or by three detectors). These situations are unique, however, and can be specifically defined to the attached processor (211). For example, if light intensity is detected at all three detectors (201), (203), and (205) (with (203) registering much higher than the other two detectors which measure equally), the source is perpendicular to the array (200).

The useable field of view of the array is then easily seen from FIG. 2 to be the field of view of the center detector (203). If the light is coming from an angle within 30° of the normal and from the right of the array, the light is seen by detectors (201) and (203). Any laser signal from the left and within 30° of the normal, will be seen by detectors (203) and (205). Light outside this field of view may be visible by one detector, but is generally not of interest. As was discussed previously, the sixty degree field of view relates to a particular design and placement of microlouvers (251), (253), and (255) as was discussed above. One of ordinary skill in the art would understand that such an arrangement is by no means necessary and by altering the spacing or angle, the microlouvers (251), (253), and/or (255) can create other useable fields of view for the array (200), as desired. Generally, however, the array (200) will be designed such that for the useable field of view of the array (200), corresponding to the area where a light source emitting light from within that field of view, will have the light detected by at least two detectors (except for in certain, predetermined, generally boundary situations). In another embodiment, a single array need only have two laser light detectors as only two are used simultaneously. The two detectors may also provide a particular field of view which is generally the area of overlap of their respective fields of view.

Figure 3:
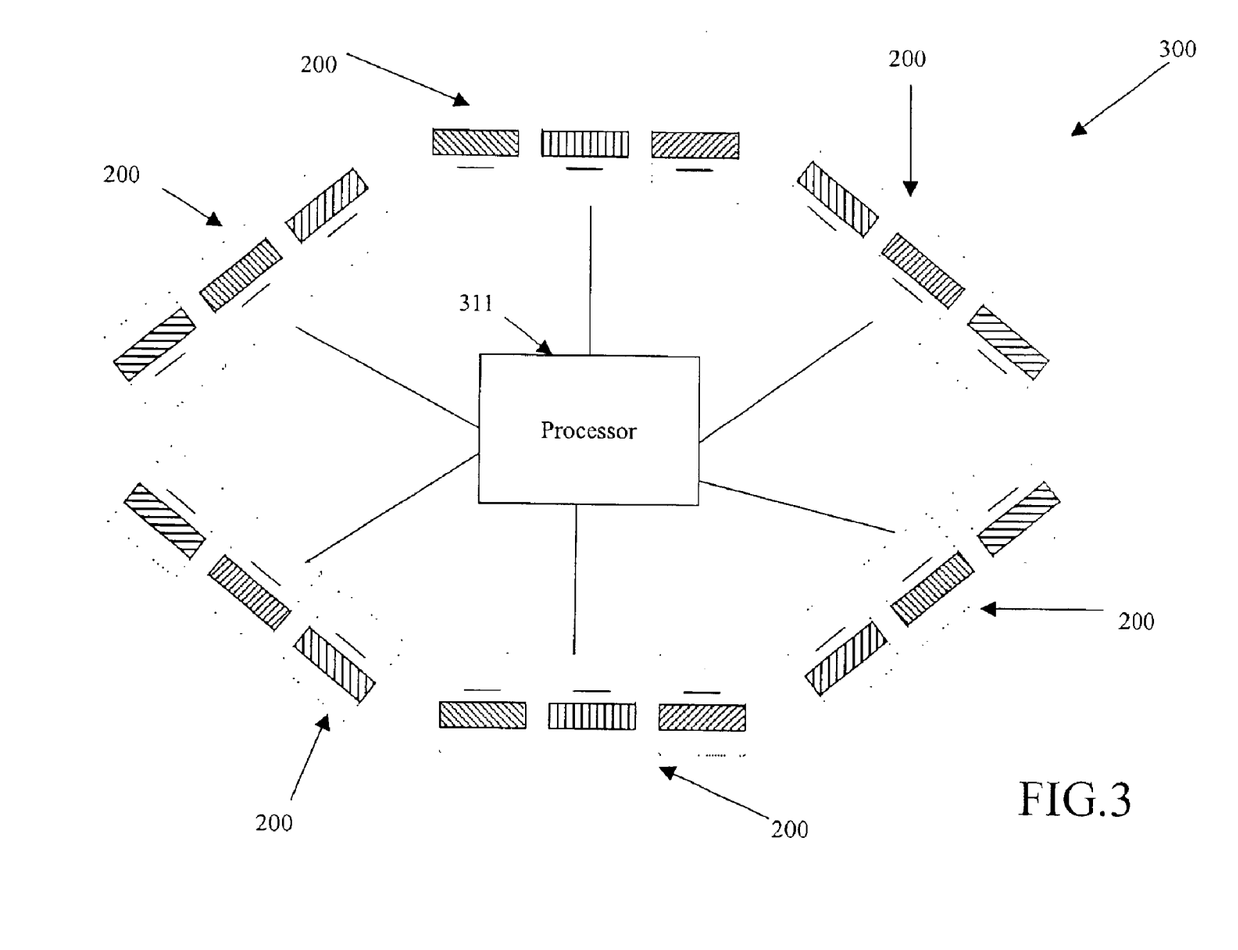
FIG. 3 provides a depiction of the layout of arrays of light detectors for an embodiment of a laser warning device.

The array (200) of FIG. 2 will thus provide a 60° field of view. However, in a combat situation, fire (and therefore the laser source), while generally from the front, can be anywhere around the object being targeted. A 60° field of view is therefore insufficient for many applications. To create a 360° (or full circle) laser warning system, multiple arrays (200) as described in FIG. 2 can be combined together at angles relative to each other. In particular, six identical arrays (200) each with a 60° field of view can be combined to form one 360° field of view (presuming no overlap of their individual fields of view). One method for doing this is shown in FIG. 3. In FIG. 3, multiple arrays (200) have been arranged on the sides of a regular hexagon (303) so that their 60° fields of view are arranged such that they cover a 360° field of view. There is then a central processor (311) (or localized processors in another embodiment) which can interpret the signals from all arrays (200) to determine the direction of a source of laser light.

A hexagonal shape is chosen because its internal angles can all be equal, and then happen to also be 60°. Therefore, each array (200) views a unique portion of the circle and each useable field of view does not overlap any other. One of ordinary skill in the art would recognize that there is some overlap at the angles as a 30 degree filter on one array and the neighboring −30 degree filter on the neighboring array may be able to both detect light near the edges of the arrays' (200) field of view. This can however be disregarded by the processor (311) and the signals from one array's (200) field of view can be analyzed. In particular, the array (200) whose center detector (203) detects the light. Alternatively, the edge case can be recognized by the processor (311) and used. Further, one of skill in the art would also recognize that with any other preselected useable field of view for the array (200), the arrays (200) can be placed so as to provide a fully circular field of view. For instance, if each arrays (200) had a 30 degree field of view, a 12 sided equal-angled figure could be used.

It is preferable, but by no means necessary, that the placement of arrays (200) result in no overlap of the useable fields of view. While a laser warning system (300) can be used where the arrays (200) have an overlapping field of view, the calculations to determine the direction can become more complicated and therefore take more processing at processor (311). Therefore the use of non-overlapping fields of view for the arrays (200) allows for simplification.

The laser warning device (300) can be built quite small. In particular, each individual light detector (100) will generally be about 1" by 3" (the size of the associated light control filter) with the light sensor being dramatically smaller and the single detector (100) having a relatively insignificant depth compared to its width and height. A single array (200) may therefore be as small as 3" by 3", with the laser warning device (300) fitting into a cylinder of 3" radius and 3" height. If optics and/or spectrum filters are used, the size may be increased, but with appropriate design choice, all of these items can be included in a compact package such as that described.

As was discussed above, using ratioing, the array (200) and therefore the laser warning device (300) can determine the direction to the laser source based on the mathematical relationships between the intensity of the two individual detectors (100) sensing the incumbent laser light. Therefore the laser warning device (300) already provides for an improvement over existing laser detectors and may be used as a laser location system. However, another embodiment of a laser location system can not only determine the direction to the laser source, but also its distance. The single array (200) is generally insufficient to determine the distance, as the single array cannot absolutely determine the intensity produced by the laser compared to the noise, and the placement of additional arrays into a laser warning system generally improves the field of view instead of determining the distance as there is only a single array illuminated by any single source.

Figure 4:
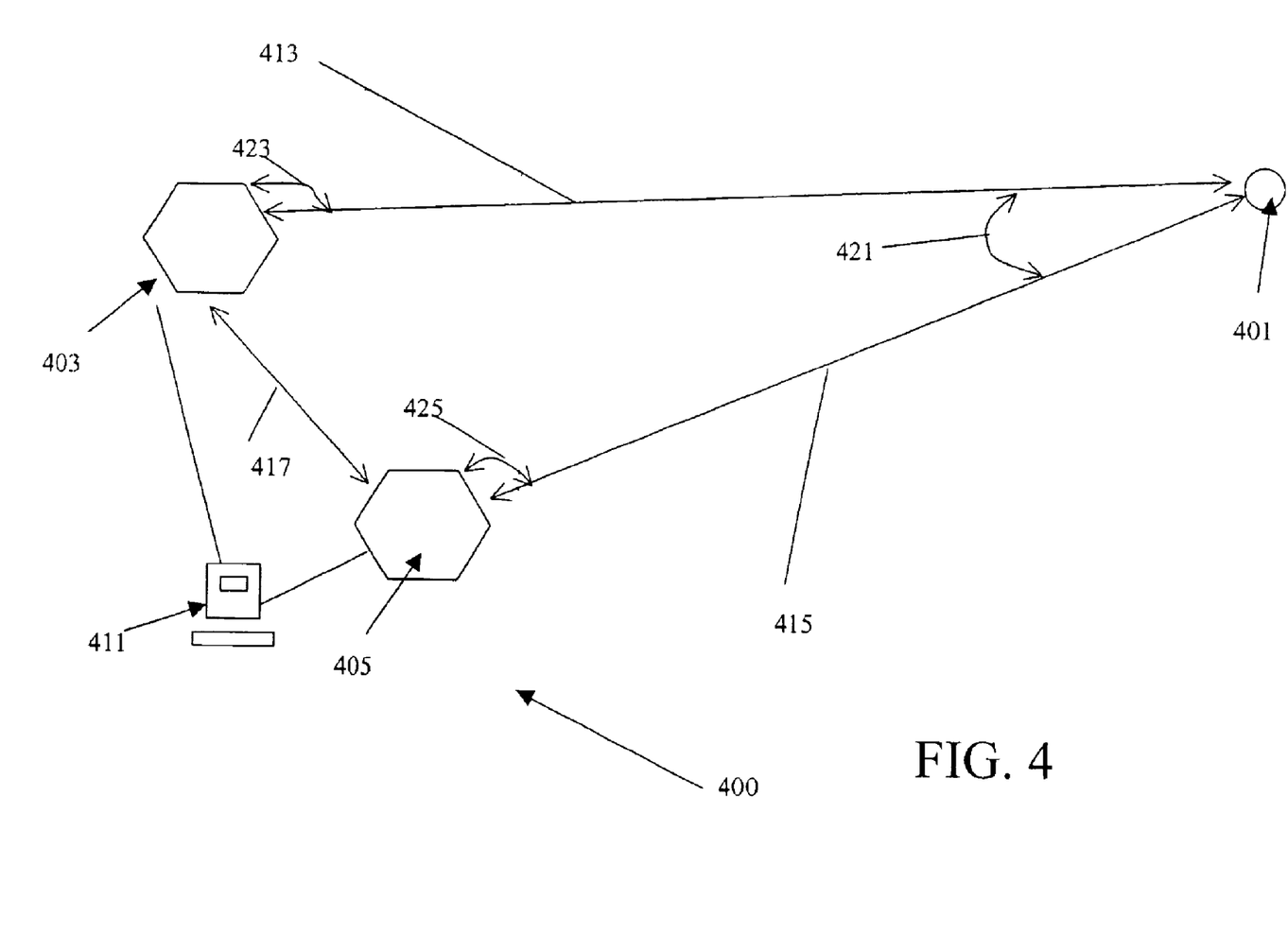
FIG. 4 provides a depiction of an embodiment of a laser location system using two of the laser warning devices depicted in FIG. 3

Through the use of ratioing across multiple laser warning devices the distance can be determined. In particular, as is shown in FIG. 4 there is a laser location system (400) comprising the use of two laser warning devices (403) and (405) a known distance apart (417) and with a known relative alignment (rotation) to each other. This setup can provide a determination of the distance of the source relative to the laser warning devices. In a preferred embodiment, the corresponding faces of each laser warning device (403) and (405) are arranged so as to be parallel with each other to improve calculation simplicity. In FIG. 4, the source of the laser is assumed to be light source (401). Each of the two laser warning devices (403) and (405) is then being hit by light from the same light source (401). It is clear that the light hitting the first detector (403) will travel a distance (413) to reach the detector while the light hitting the second detector (405) will travel a distance (415). Further, the light will impinge on the two devices at each of two angles (423) and (425), the value of which each detector can be determined by determining the direction of the light source as discussed above.

Since the two light paths are from the same source, the difference in intensity detected by the different laser warning devices (403) and (405) is primarily due to the difference in the angles (423) and (425) (as any difference in the distances (413) and (415) is generally negligible), as determined by the associated array at that detector. Essentially, this setup provides a new ratio. In particular, the ratio of the two devices (403) and (405) can be used to determine the relative angles (423) and (425) of the two light paths. These angles (423) and (425) can then be used in combination with the distance (417) to determine the location of the light source relative to the devices (403) and (405), the angle (421), and/or the distance of the light source from a point whose position is known relative to at least one of the devices (403) and (405), using geometry. As discussed in conjunction with FIG. 2, the use of ratios interrelated to the sums and differences of intensity can again cancel out the effect of ambient light. In another embodiment, the two directions determined by each detector can be logically superimposed to determine their point of intersection, and the relationship of the distances (415) and (413) can be determined. In this way, the laser location system (400) can determine the distance in addition to the direction.

Using the two laser warning device laser location system (400) of FIG. 4, it is therefore possible to determine the location of the laser source with both a direction and a distance which, when combined with the location of a portion of the location system (400) or other known point, provides the resultant location of the laser source. As should be apparent, the determination of the direction and distance can be quickly done by a computer or other processor (411) attached to the devices. This determination can then be used by a fighting vehicle (such as a tank) to be able to return fire upon a unit which is firing upon them as soon as they are illuminated by the enemy for targeting (as the direction and distance for firing can be extracted from the values provided by the laser location system (400)).

In other embodiments, the information can be combined with the location of the vehicle relative to other weapon installations (such as by using GPS or inertial systems) and provided to those other weapon installations. Processors at those installations can then determine the location of the enemy relative to themselves and return fire. Further, laser illumination from multiple sources at multiple targets can be received at a central command area or other data accumulator and can be used to provide indications of unit deployment or other information which may be useful for commanders in coordinating an attack or defense against the enemy that is attacking them. Finally, the data may be recorded for later analysis to determine the effect of deployment and responses on the outcome of a battle or training simulation.

In a still further embodiment, the laser location systems may be placed on target dummies or other objects placed within a group of vehicles to encourage fire on the dummies. In this way the force can attack the attackers who have failed in their attack.

In yet another embodiment, an attached processor can recognize changes in the laser targeter's direction and/or distance over the time of illumination by the laser targeter. It can then compute from these changes the speed and direction of motion of the laser targeter or other light source.

Calculations

The following provides for some of the mathematical relationships to indicate that an array of light filters, such as array (200) can have a sufficiently high signal to noise ratio (SNR) to be effective for use under a multitude of possible conditions to provide both accurate indications of when the target is being illuminated by a laser targeter, and to not provide a false indication that the target is being targeted.

If one begins with the assumption that the originating laser is essentially a point light source directed at the target, Equation 1 provides for the laser spot diameter (d) at distance R from the source to the target.

$$d = \theta R \quad (1)$$

where θ=the beam divergence in radians

Therefore the area of the spot is given by:

$$A = \frac{\pi d^2}{4} = \frac{\pi \theta^2 R^2}{4} \quad (2)$$

The irradiance at the target is provided by equation 3:

$$E = \frac{P_0 \tau_a}{A} = \frac{4 P_0 \tau_a}{\pi \theta^2 R^2} \quad (3)$$

Where $P_0$ is defined as the laser power and $\tau_a$ is defined as the atmospheric transmission for the wavelength of the particular laser being used.

Therefore, the power incident on the individual light detector (100) (assuming no collecting optics are used to increase the power) is then:

$$P_d = E A_d \tau_a \tau_0 = \frac{4 P_0 A_d \tau_a \tau_0}{\pi \theta^2 R^2} \quad (4)$$

Where $A_d$ is the area of the detector and $\tau_0$ is the transmission of the optics. The peak signal voltage of the detector when hit by a laser is then:

$$V_s \mathcal{R}_\lambda P_d \quad (5)$$

Where $\mathcal{R}_\lambda$ is defined as the spectral responsivity of the detector at the laser's wavelength and is related to the detectivity at the laser wavelength by Equation 6 where $V_n$ is the signal voltage of the ambient noise $$\mathcal{R}_\lambda = D_\lambda^* \frac{V_n}{\sqrt{A_d \Delta f}} \quad (6)$$

Combining Equations 4, 5, and 6 allows for the calculation of the signal to noise ratio (SNR) of the detector.

$$SNR \equiv \frac{V_S}{V_n} = \frac{4 D_\lambda^* 4 P_0 \tau_a \tau_0}{\pi \theta^2 R^2} \sqrt{\frac{A_d}{\Delta f}} \quad (7)$$

The atmospheric attenuation for a laser line ($\tau_a$) at 1.06 μm may be calculated as a function of range, R, by using the extinction coefficient σ and Equation 8.

$$\tau_a = e^{-\sigma R} \quad (8)$$

Values for the extinction coefficient for various laser lines, five model atmospheres, and two different aerosol conditions have previously been tabulated by R. A. McClatchey et. al in "Optical Properties of the Atmosphere"—AFCRL-71-0279, Environmental Research Paper 354, AD 726116, May 10, 1971, the entire disclosure of which is herein incorporated by reference. The two model aerosols are labeled by the descriptions of clear and hazy. The former implies a visibility of 23 km while the latter implies a visibility of 5 km. These aerosol components turn out to be the major contributions to the extinction coefficients, dominating the results regardless of which model atmosphere is chosen. If the worst model atmosphere (for transmission at this wavelength) is chosen, which was subarctic winter, the extinction coefficients obtained were 0.08724 km$^{-1}$ for clear conditions and 0.42734 km$^{-1}$ for hazy conditions.

For lead selenide (PbS), a commonly used material for detecting infrared light, $D_\lambda^*$ is around $10^{10}$ to $10^{11}$ cm Hz$^{1/2}$/W at 1 μm and 295K temperature. Many military laser targeters are pulsed and use about 6 ns pulses, forcing bandwidth to be on the order of 1.67×10$^8$ Hz, so at this high a bandwidth we only assume a $D_\lambda^*$ value of $10^9$ cm Hz$^{1/2}$/W. To use Equation 7, $A_d$ and R would both have to be in cm. We assume a power of $10^7$ W, and a beam divergence of θ=10$^{-3}$ radian. Most laser line spectral filters (153) have a peak transmission of about 50% and the support (102) when made of plastic film has a peak transmission of about 75%. Therefore the optics transmission to the light sensor (103) is about 38%. Further the light sensor (103) can have an active area of about 5×10$^{-2}$ cm$^2$, which is comparable to that of light sensors made and sold commercially.

Figure 5:
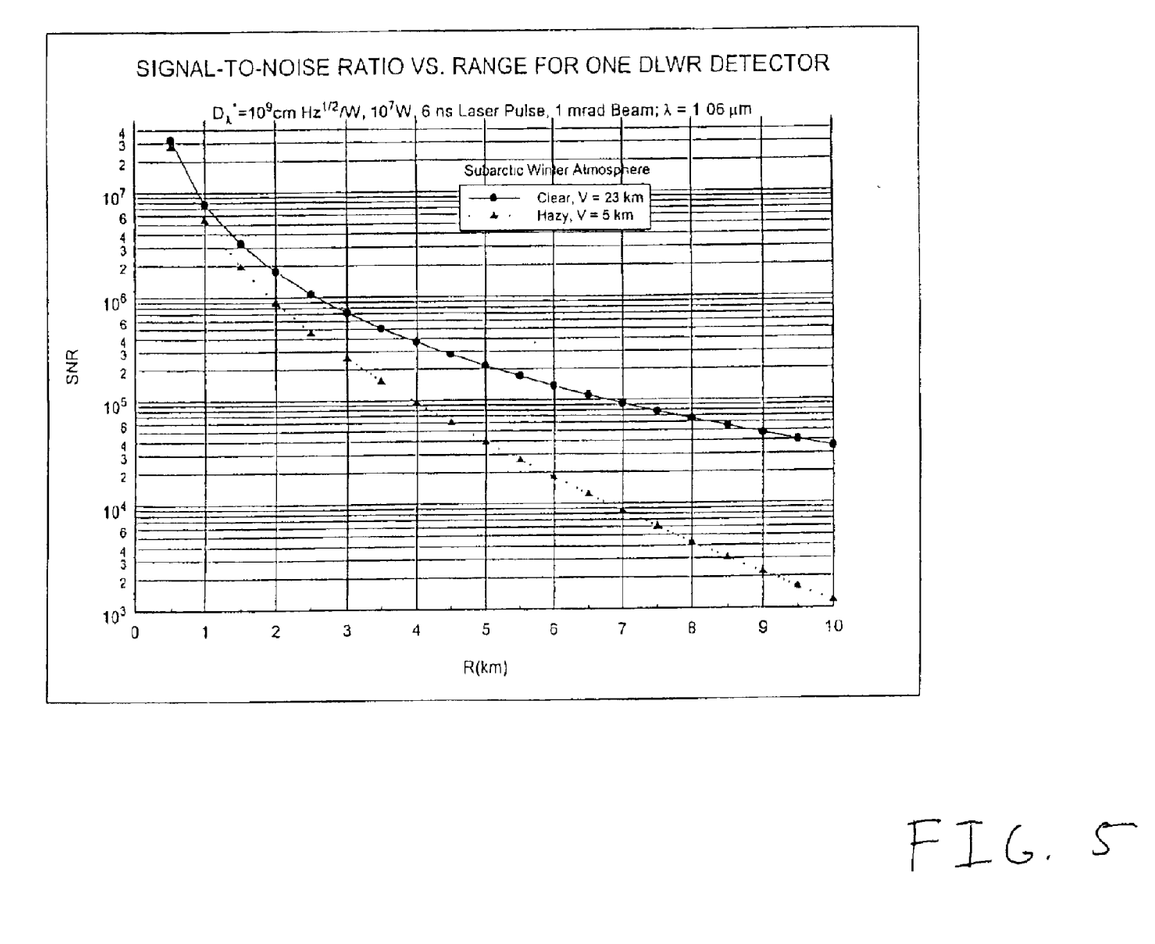
FIG. 5 provides for a graph of the signal to noise ratio of a light detector such as that described in FIG. 1.

When all these values are used in equation (7), with the distance (range R) as the independent variable, we arrive at very large values of SNR, even for very large ranges as illustrated by FIG. 5.

FIG. 5, however, shows the maximum signal to be expected from a single detector (100), when the laser beam is coming from an angle equal to the angle (107) of the microlouvers (105) for that detector (on FIG. 1 this would be light source (191) relative to the detector (100)). Because the maximum transmission of 75% was used in calculating the optics transmission, however, it also needs to be taken into account that each light filter (101) has a "fall off" function of angle, and the laser signal generally is incident on two adjacent detectors in a particular array (200) as shown in FIGS. 2 and 3.

For purposes of calculation, suppose the "fall off" function is called $f(\theta)$, where $\theta$ is measured from the axis at the angle (107) of the microlouvers (105). It is reasonable to suppose the function is symmetric around the axis:

$$f(\theta)=f(-\theta) \quad (9a)$$

$$f(0)=1 \quad (9b)$$

Also from the embodiment depicted in FIG. 2 it is clear that based on the selected angle (107) of the particular detector (201) or (205) being 30 degrees from the angle of the other used detector (which is always the center detector (203) set to zero degrees), the two detectors are interrelated by equation 10.

$$f(\theta_{201/205})=f(30°-\theta_{203}) \quad (10)$$

Where $\theta_{201/205}$ is the fall off for detector (201) or (205) and $\theta_{203}$ is the fall off for detector (203).

If we then threshold the sum of the two signals from the two detectors, then the signal-to-noise ratio of that sum (assuming both detectors have identical Gaussian noise) is $$SNR_c = \frac{SNRf(\theta_{203}) + SNRf(30° - \theta_{203})}{\sqrt{2}} = SNR\frac{f(\theta_{203}) + f(30° - \theta_{203})}{\sqrt{2}} \quad (11)$$

where $SNR_C$=signal-to-noise ratio for the combined signals and SNR=maximum signal-to-noise ratio for a single detector as calculated in Equation 7.

It is clear from Equation 11 that the least that $SNR_C$ can be is $SNR/\sqrt{2}$, when the beam is along the axis of one detector and just out of the field-of-view of the other ($\theta_{203}=0°$ or 30°). Therefore we can see that the combined signal also displays very high SNR. This allows us to obtain a very high probability of detection along with a very low false alarm rate.

For example, based on the RCA Electro-Optics Handbook (1974) pp. 111–112, the entire disclosure of which is herein incorporated by reference, an SNR value of just 13 allows one to threshold such that a probability of detection of 99.9% is obtainable with a false alarm rate (FAR) of $10^{-22}/\Delta t$, where $\Delta t$=laser pulse time. Using our pulse time of 6 ns, we find FAR=$1.67\times10^{-14}$ s$^{-1}$. With 86400 seconds in a day, this result is the same as FAR=$1.44\times10^{-9}$/day is significantly high to be useable under battlefield conditions While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

What is claimed is:

1. A laser warning device comprising:
   an array of at least two light detectors; each of said light detectors comprising
      a light sensor; and
      a light control filter;
   wherein each of said light control filters comprises a plurality of microlouvers; and
   wherein the angle of said microlouvers in said first light control filter is different from the angle of said microlouvers in said second light control filter.

2. The laser warning device of claim 1 wherein said array comprises at least three light detectors the angle of said microlouvers in said third light control filter being different from the angles of said first and said second light control filters.

3. The laser warning device of claim 2 wherein said microlouvers in said first light control filter are generally 30° in one direction from staid microlouvers in said second light control filter and said microlouvers in said third light control filter are generally 30° in the opposite direction from said microlouvers in said second light control filter.

4. The laser warning device of claim 3 wherein said microlouvers of said second light control filter are perpendicular to said plane.

5. The laser warning device of claim 1 wherein said microlouvers of one of said light control filters are perpendicular to said plane.

6. The laser warning device of claim 1 wherein said microlouvers of one of said light control filters are generally arranged 30° from the perpendicular to said plane.

7. A laser warning device comprising:
   an arrangement of a plurality of arrays of light detectors, each of said arrays including;
      at least two light detectors wherein each of said light detectors includes a light sensor and a light control filter;
   wherein each of said light control filters comprises a plurality of microlouvers, and wherein the angle of said microlouvers in a first light control filter is different from the angle of said microlouvers in a second light control filter.

8. The laser warning device of claim 7 wherein at least one of said arrays comprises at least three light detectors.

9. The laser warning device of claim 7 wherein at least one of said arrays has a field of view of generally 60°.

10. The laser warning device of claim 7 wherein said plurality of arrays comprises exactly six arrays.

11. The laser warning device of claim 7 wherein said arrangement is hexagonal.

12. The laser warning device of claim 7 wherein said arrangement is hexagonal.

13. A laser location system comprising:
   at least two light detecting devices, each comprising:
      an arrangement of a plurality of arrays of light detectors, each of said arrays including at least two light detectors, and each of said light detectors including a light sensor and a light control filter;
      wherein each of said light control filters comprises a plurality of microlouvers, and wherein the angle of said microlouvers in a first light control filter selected from a first array is different from the angle of said microlouvers in a second light control filter also selected from said first array.

14. The laser warning device of claim 1 wherein said laser warning device can detect illumination by a laser rangefinder.

15. The laser location system of claim 13 wherein said laser warning devices are a known distance apart.

16. The laser warning device of claim 1 wherein said laser warning device is mounted on a military vehicle.

17. A light detecting device comprising:
- an array of at least two light detectors; each of said light detectors comprising
  - a light sensor; and
  - a light control filter;
- wherein each of said light control filters comprises a plurality of microlouvers; and
- wherein the angle of said microlouvers in said first light control filter is different from the angle of said microlouvers in said second light control filter.

18. The laser location system of claim 13 wherein said arrangement is hexagonal.

19. The laser location system of claim 13 wherein said system can also determine the distance to the source of said laser light incident thereon.

20. A method of locating light source comprising:
- providing a plurality of light detectors, each light detector comprising
  - a light sensor; and
  - a light control filter comprising a plurality of microlouvers arranged at an angle to the plane of said light control filter;

providing that the angle of said microlouvers in a first light detector be different from the angle of the microlouvers in a second light detector, and that angle of the microlouvers in a third light detector be different from the angle of the microlouvers in a fourth light detector; arranging said first light detector and said second light detector into a first array, and arranging said third light detector and said fourth light detector into a second array;

positioning said first array at a known distance and orientation relative to said second array;

defining a predetermined point with a position known relative to at least one of said first array and said second array;

receiving light from a light source at both said first array and said second array;

determining the direction of said light source relative to both said first array and said second array;

calculating the distance of said light source from said predetermined point.

* * * * *